(12) United States Patent
Maeda

(10) Patent No.: US 6,833,539 B1
(45) Date of Patent: Dec. 21, 2004

(54) ACCESSORY UTILIZING A LIGHT EMITTER

(76) Inventor: Minoru Maeda, 36-7, Matsubara 1-chome, Setagaya-ku, Tokyo, 156-0043 (JP)

( * ) Notice: Subject to any disclaimer, the term of this patent is extended or adjusted under 35 U.S.C. 154(b) by 0 days.

(21) Appl. No.: 10/615,530

(22) Filed: Jul. 8, 2003

(51) Int. Cl.⁷ .................................................. H01J 40/14
(52) U.S. Cl. ............................... 250/214 AL; 250/239; 362/104; 63/29.1
(58) Field of Search ....................... 250/214 AL, 214 B, 250/239, 214 R, 216; 362/103, 104; 315/155, 158; 63/29.1, 26

(56) References Cited

U.S. PATENT DOCUMENTS 3,643,467 A * 2/1972 Postel ........................ 63/29.1
4,899,556 A * 2/1990 Ford ............................ 63/14.1
4,973,835 A * 11/1990 Kurosu et al. ........ 250/214 AL

* cited by examiner

Primary Examiner—Kevin Pyo
(74) Attorney, Agent, or Firm—Grossman & Flight, LLC

(57) ABSTRACT

An accessory utilizing a light emitter that is capable of detachably attaching a transparent body such as a gem is provided. Because the transparent body is detachable and re-attachable, it is easily possible to use a plurality of transparent bodies on one accessory. Also, it is possible to use the accessory in a wide variety of situations according to time, place and occasion. Further, providing a family crest, engraved mark, trade mark, illustration and/or the like on the accessory not only embellishes the effect of the accessory, but also makes the accessory more distinctive.

15 Claims, 18 Drawing Sheets

Fig. 9

| CLOCK | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Q0(RED) |  | ON |  | ON |  | ON |  | ON |  | ON |  | ON |  | ON |  | ON |
| Q1(BLU) |  |  | ON | ON |  |  | ON | ON |  |  |  | ON |  |  | ON | ON |
| Q2(GRN) |  |  |  |  | ON | ON | ON | ON |  |  | ON |  | ON | ON | ON | ON |
| Q3(YEL) |  |  |  |  |  |  |  |  | ON | ON | ON | ON | ON | ON | ON | ON |

ACCESSORY UTILIZING A LIGHT EMITTER

BACKGROUND OF THE INVENTION

1. Field of the Invention

The present invention relates to an accessory utilizing a light emitter. More particularly, the present invention relates to an accessory capable of fixing a transparent body detachably utilizing a light emitter.

2. Related Background of the Invention

As accessories, rings, earrings, pendants, and the like that utilize gems, imitation doublets, and the like (to be referred to as "accessory bodies" hereinafter) are known. These accessories exhibit unique colors and brilliance when light is transmitted, refracted, or reflected in the accessory bodies, thereby giving aesthetic stimulation to those who see them.

However, these accessories cannot provide their unique colors and brilliance unless light is incident onto the accessory bodies from the outside.

The color of a conventional accessory is uniformly determined according to the gem to be used and its arrangement, and the number of kinds of colors depends on combinations of gems used. For this reason, there is no originality in visual stimulation, and the degree of freedom of design is low.

Furthermore, when a gem is used as an accessory body, it is difficult to work, resulting in an expensive accessory.

In addition, since a gem is usually fixed to an accessory in a non-detachable manner, it is impossible to enjoy one accessory with many kind of gems.

SUMMARY OF THE INVENTION

It is an object of the present invention to provide an accessory body that utilizes a light emitter and is capable of detachably attaching a transparent body such as a gem. By detachably attaching the transparent body, it is easily possible to change a plurality of transparent bodies on one accessory. Also, it is possible to use the accessory in a wide variety of situations according to time, place and occasion. Further, by providing a family crest, engraved mark, trademark, illustration and the like on the accessory, not only embellishment effect but also discrimination effect can be obtained.

It is another object of the present invention to provide an accessory which can provide a color and brilliance unique to its accessory body even if no light is incident onto the accessory body from the outside.

It is still another object of the present invention to provide an accessory which has originality in aesthetic stimulation and a high degree of freedom in design.

It is still another object of the present invention to provide an accessory which can be easily worked and is relatively inexpensive.

In order to achieve these objects, according to the present invention, there is provided an accessory utilizing a light emitter, comprising:

a transparent body;

a transparent body fixing member for receiving said transparent body;

holding member for detachably attaching said transparent body on said transparent body fixing member;

said light emitter, arranged near the transparent body, for intermittently emitting light upon reception of an electrical signal;

first pulse generator for generating a first pulse signal at a relatively short pulse interval;

photo detector for detecting light incident on said transparent body and generating a light detection signal;

second pulse generator for generating a second pulse signal at a relatively long pulse interval;

signal processor for receiving the first pulse signal, the second pulse signal, and the light detection signal and supplying the electrical signal to said light emitter at a predetermined timing;

a circuit board for mounting said light emitter, first pulse generator, photo detector, second pulse generator and signal processor thereon;

a board fixing member connected to said transparent body fixing member for fixing said circuit board; and a battery holding member connected to said board fixing member for holding a battery.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 9 shows an output signal table of electrical signals output to the signal processor according to the first embodiment of the present invention;

DESCRIPTION OF THE PREFERRED EMBODIMENTS

Embodiment 1

Figure 1:
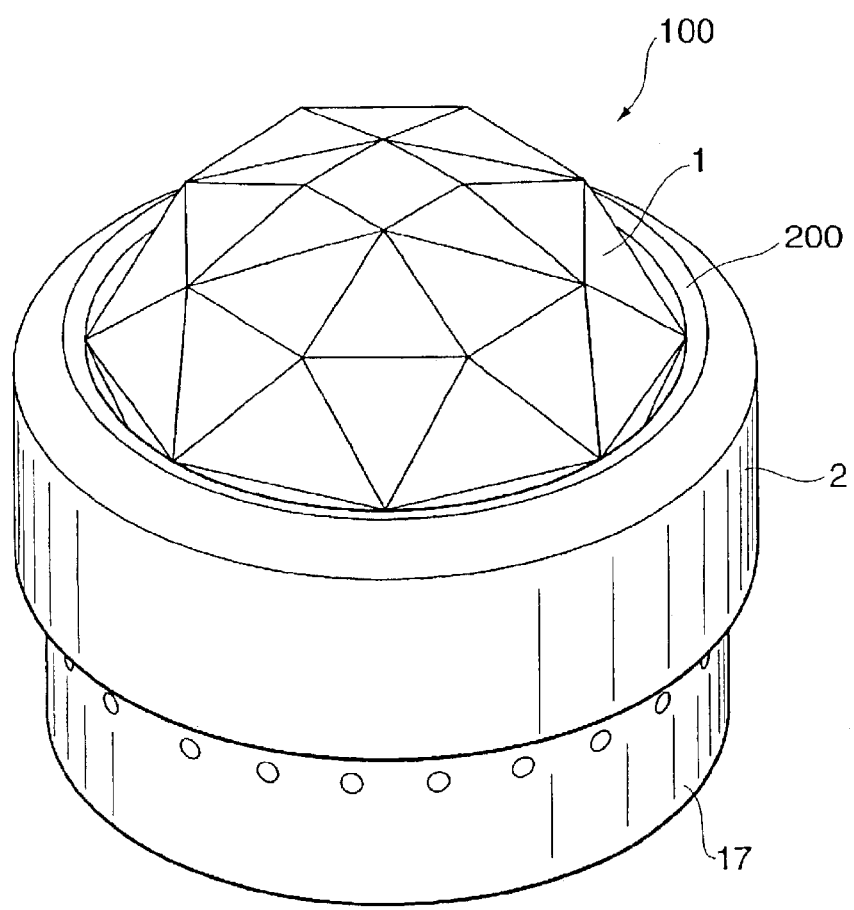
FIG. 1 is a schematic perspective view showing an accessory according to the first embodiment of the present invention.
Figure 2:
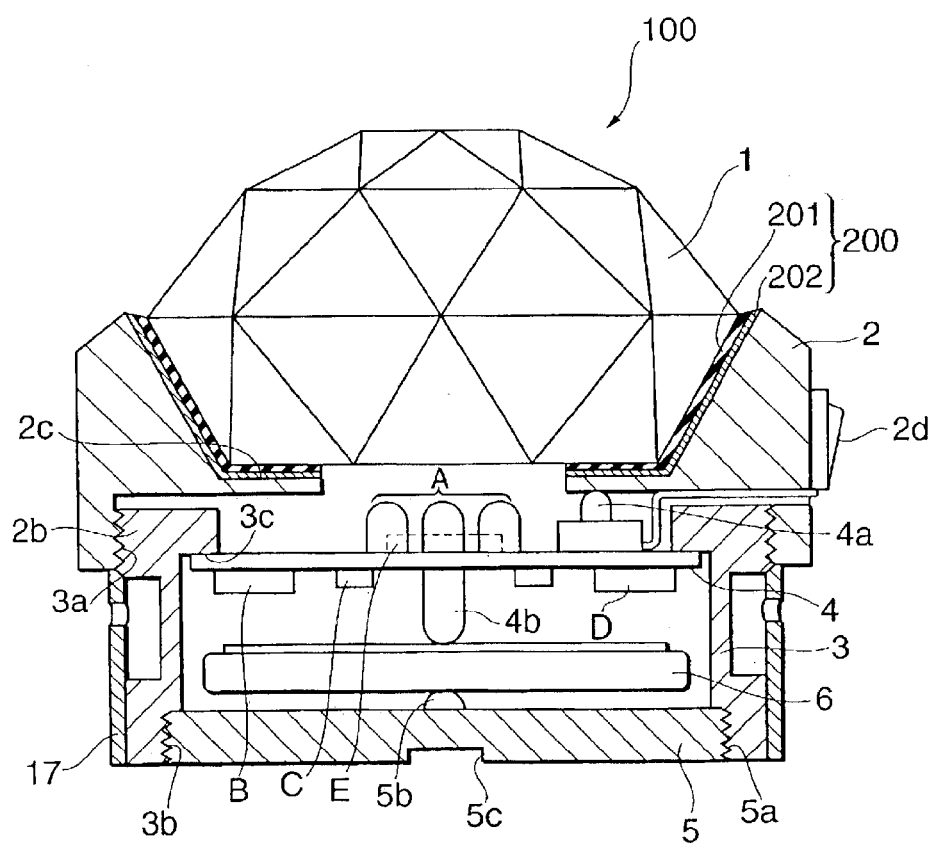
FIG. 2 is a schematic sectional view of the accessory shown in FIG. 1.
Figure 3:
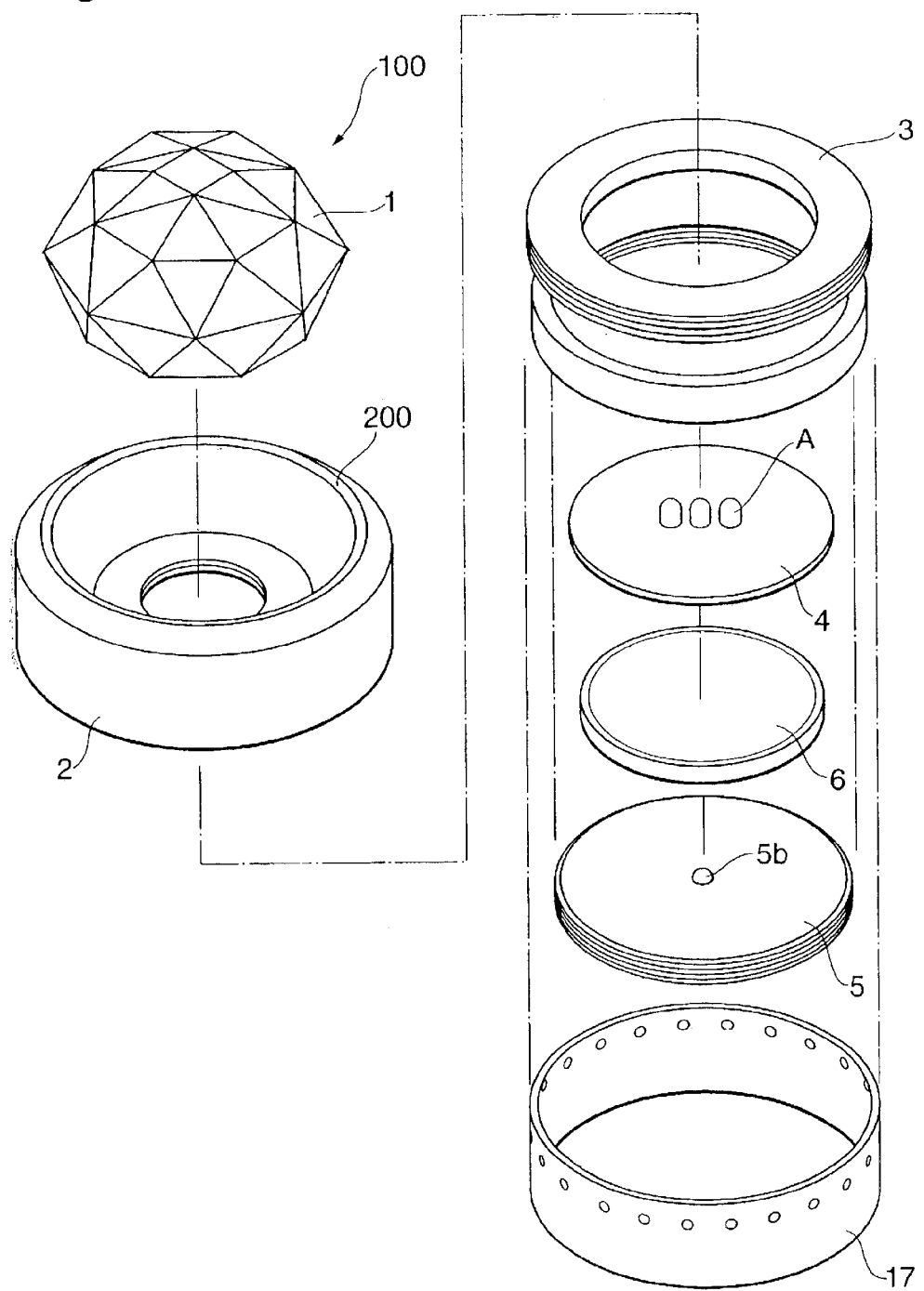
FIG. 3 is a schematic exploded perspective view of the accessory shown in FIG. 1.
Figure 4:
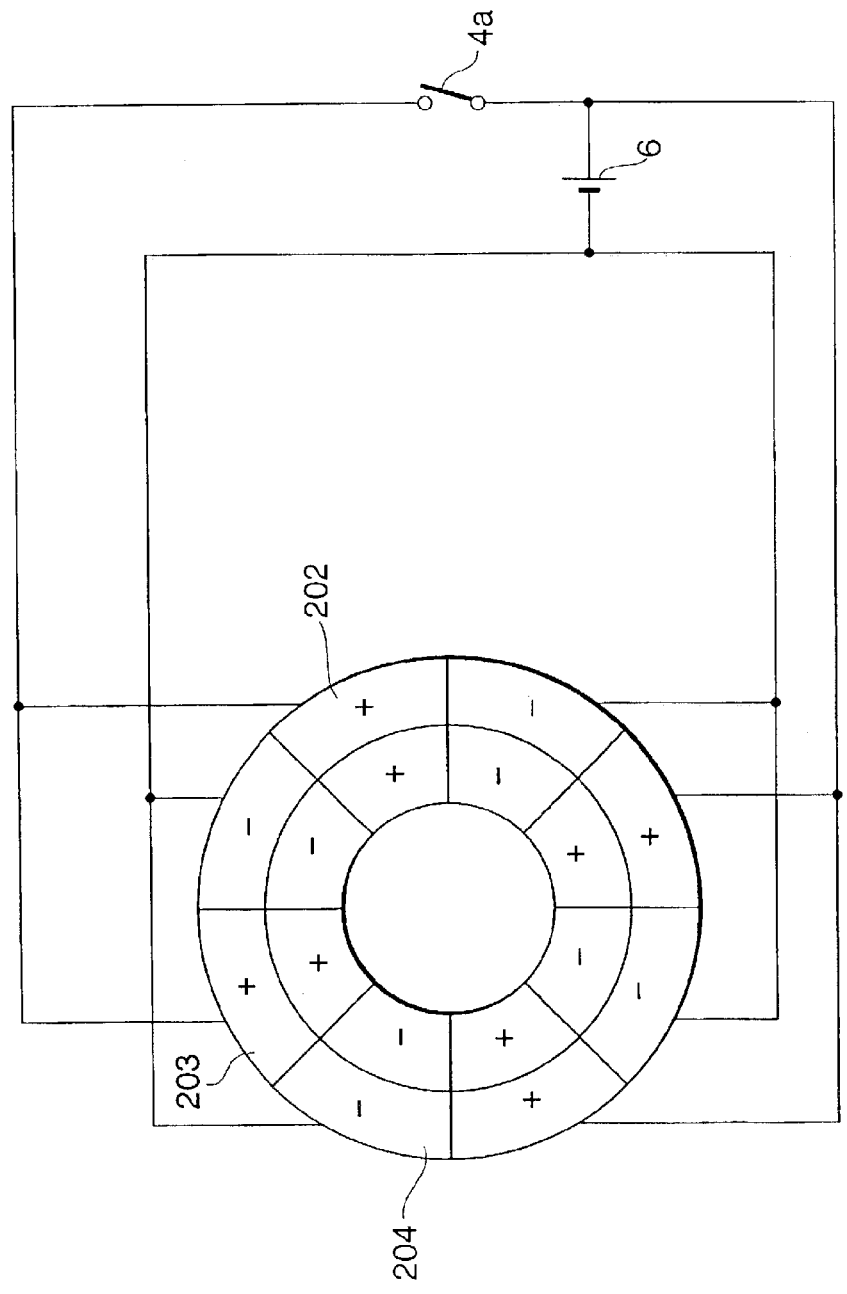
FIG. 4 is a plan view showing a electrode layer.

FIG. 1 is a schematic perspective view showing an accessory according to the first embodiment of the present invention, FIG. 2 is a schematic sectional view of the accessory shown in FIG. 1, and FIG. 3 is a schematic exploded perspective view of the accessory shown in FIG. 1. In these figures, the accessory 100 basically comprises the transparent body 1, a transparent body fixing member 2 for receiving the transparent body 1, holding member 200 for detachably attaching the transparent body 1 on the transparent body fixing member 2, a board fixing member 3, a circuit board 4, and a battery holding member 5.

The surface of the transparent body 1 is cut into, e.g., a polyhedron, so that internal light is satisfactorily reflected, refracted, or diffused by the whole surface. The transparent body 1 may or may not be colored. The transparent body 1 is fixed to the transparent body fixing member 2 of, e.g., plastic, which does not allow light to pass therethrough.

A holding portion 200 for holding the transparent body 1 is formed on the upper portion of the transparent body fixing member 2, and the transparent body 1 is held thereon through an adhesive or claw (not shown). A coupling portion 2b having female threads on its inner surface is formed on the lower portion of the transparent body fixing member 2 to mount the board fixing member 3. Furthermore, a flange 2c is formed at the central portion of the transparent body fixing member 2. A switch 4a fixed on the circuit board 4 is depressed by the flange 2c. A switch 2d is fixed on the surface of the transparent body fixing member 2 and is connected to the circuit board 4 by a lead wire.

For the holding member 200 of the transparent body 1, for example, an electrostatic absorption sheet can be used. The electrostatic absorption sheet 200 includes a synthetic resin sheet 201 as a dielectric material and an electrode layer 202 provided integrally on the rear side of the synthetic resin sheet 201 by means of, for example, printing. The electrode layer 202 has a positive electrode 203 and a negative electrode 204 and connected to a battery 6.

For the synthetic resin sheet 201, polyvinyl fluoride, polyvinylidene fluoride and the like which have excellent dielectric property can be used. In order to improve an adhesiveness to printing ink, the rear surface of the synthetic resin sheet 201 is roughened. To the thus roughened rear surface of the synthetic resin sheet 201 conductive ink is printed with a predetermined pattern thereby forming the electrode layer 202 disposed the positive electrode 203 and the negative electrode 204 alternately.

The board fixing member 3 is formed of a conductive material such as a metal. A first coupling portion 3a having male threads on its surface is formed on the upper portion of the board fixing member 3, and is threadably engaged with the transparent body fixing member 2. A second coupling portion 3b having female threads on its inner surface is formed on the lower portion of the board fixing member 3 so as to mount the battery holding member 5. A holding portion 3c for holding the circuit board 4 is formed between the coupling portions 3a and 3b.

The light emitter A, the signal processor B, the first pulse generator C, the second pulse generator D, and the photo detector E that will be described in more detail below are assembled on the circuit board 4 with integrated circuits by use of miniature plana mounting print wiring technique. The light emitter A and the photo detector E are arranged on the upper surface of the circuit board. For this reason, light can be emitted toward the transparent body 1, and external light can be detected. Electronic parts constituting the signal processor B, the first pulse generator C, and the second pulse generator D are arranged on the lower surface of the circuit board. Furthermore, a contact member 4b for a battery 6 is formed on the lower surface of the circuit board 4.

The battery holding member 5 also serves as a battery lid, and is formed of a substantially disk-like conductive material. For this reason, a coupling portion 5a having male threads is formed on the peripheral surface of the battery holding member 5, and is threadably engaged with the board fixing member 3. A projection 5b is formed on the upper surface of the battery holding member 5 to constitute a contact for the battery 6. The battery 6 is clamped between the contact member 4b formed on the lower surface of the circuit board 4 and the projection 5b to supply power to the electronic parts assembled on the circuit board 4. Since a groove 5c is formed on the lower surface of the battery holding member 5, the battery holding member 5 can be easily attached/detached.

The accessory 100 according to the first embodiment is constructed as mentioned above, the operation of which is explained as follows.

In FIGS. 1 to 4, the battery holding member 5 is first removed from the board fixing member 3, a battery is inserted into the bottom portion of the board fixing member 3 and then the battery holding member 5 is closed to accommodate the battery 6. By tightening the screw of the first coupling portion 3a, the transparent body fixing member 2 is attached to the board fixing member 3. At this time, a switch 4a is closed. Then, current from the battery 6 is supplied to the electrode layer 202 having the positive electrode 203 and the negative electrode 204 and the electrostatic attractive force caused by the electrode layer 202 will fix the transparent body 1 to the transparent body fixing member 2.

When removing the transparent body 1, the screw of the first coupling portion 3a is released to open the switch 4a. This will stop the application of current to the electrode layer 202 and eliminate the electrostatic attractive force. Therefore, the fixing and releasing of the transparent body 1 can be performed easily by the open/close operation of the switch 4a. It should be noted that the power switch is not limited to the switch 4a but it is possible to provide it to the outside of the accessory 100, such as the portion of the switch 2d. In this case, the fixing and releasing of the transparent body 1 can be performed by means of the outside switch without releasing the screw of the first coupling portion 3a.

Figure 5:
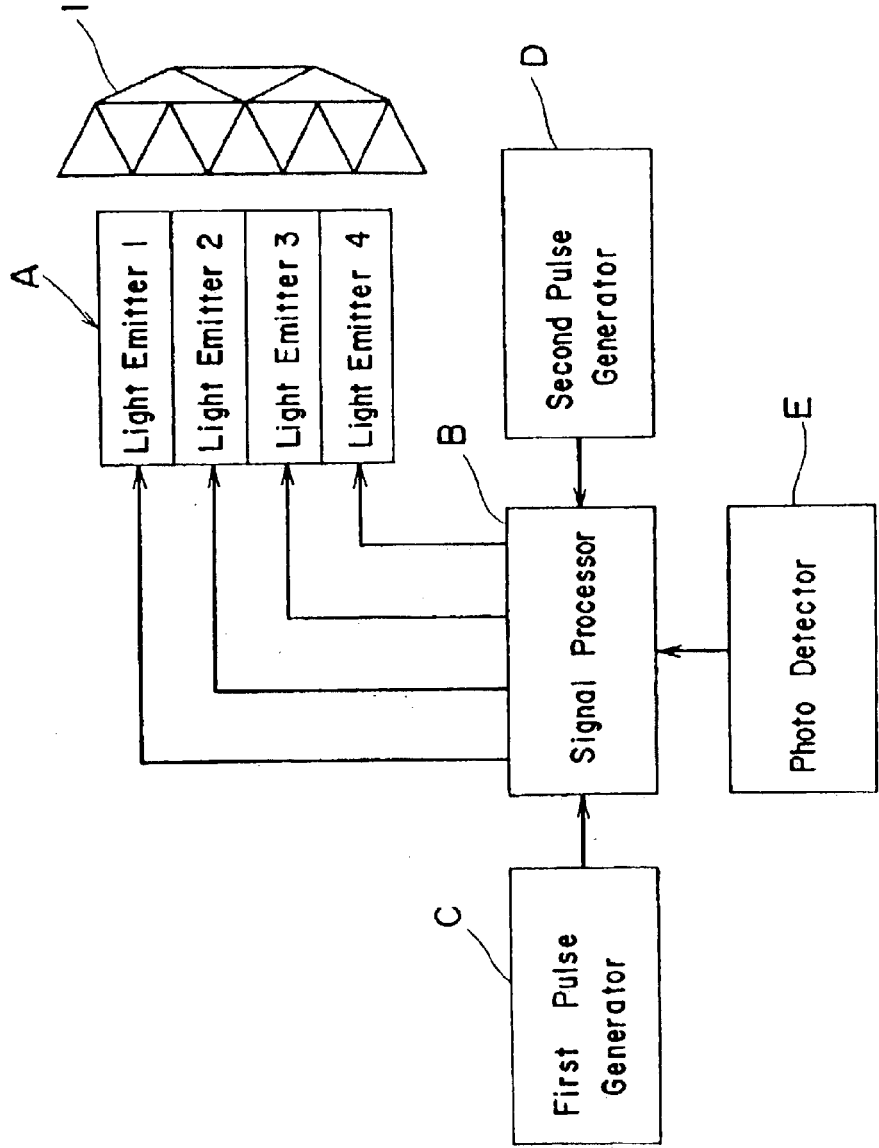
FIG. 5 is a block diagram showing a basic arrangement of an accessory according to the first embodiment of the present invention.

FIG. 5 shows the basic structure of the accessory 100 according to the first embodiment of the present invention. The present invention basically comprises a light emitter A, a signal processor B, a first pulse generator C, a second pulse generator D, and a photo detector E. The disclosure of the U.S. Pat. No. 4,973,835 is incorporated herewith by reference.

The light emitter A is arranged on or near a transparent body 1, and is connected to the signal processor B. The signal processor B is connected to the first pulse generator C, the second pulse generator D, and the photo detector E.

One or a plurality of light-emitting members A may be arranged, and a light-emitting element such as an LED may be used. The light emitter A externally emits light through the transparent body 1. The first pulse generator C generates a first pulse signal having a relatively short pulse interval, and the second pulse generator D generates a second pulse signal having a pulse interval at least longer than the first pulse signal. The photo detector E detects light incident from the transparent body 1, and generates a light detection signal. These signals are supplied to the signal processor B and are subjected to predetermined signal processing.

More specifically, only when the signal processor B receives the second pulse signal and does not receive the light detection signal, it controls a light-emission timing to cause the light emitter A to emit light based on the first pulse signal. For this reason, when light is not incident by the transparent body 1, the light emitter A is repeatedly turned on/off to intermittently emit light. In this case, an ON/OFF time depends on the pulse interval of the second pulse signal.

Figure 6:
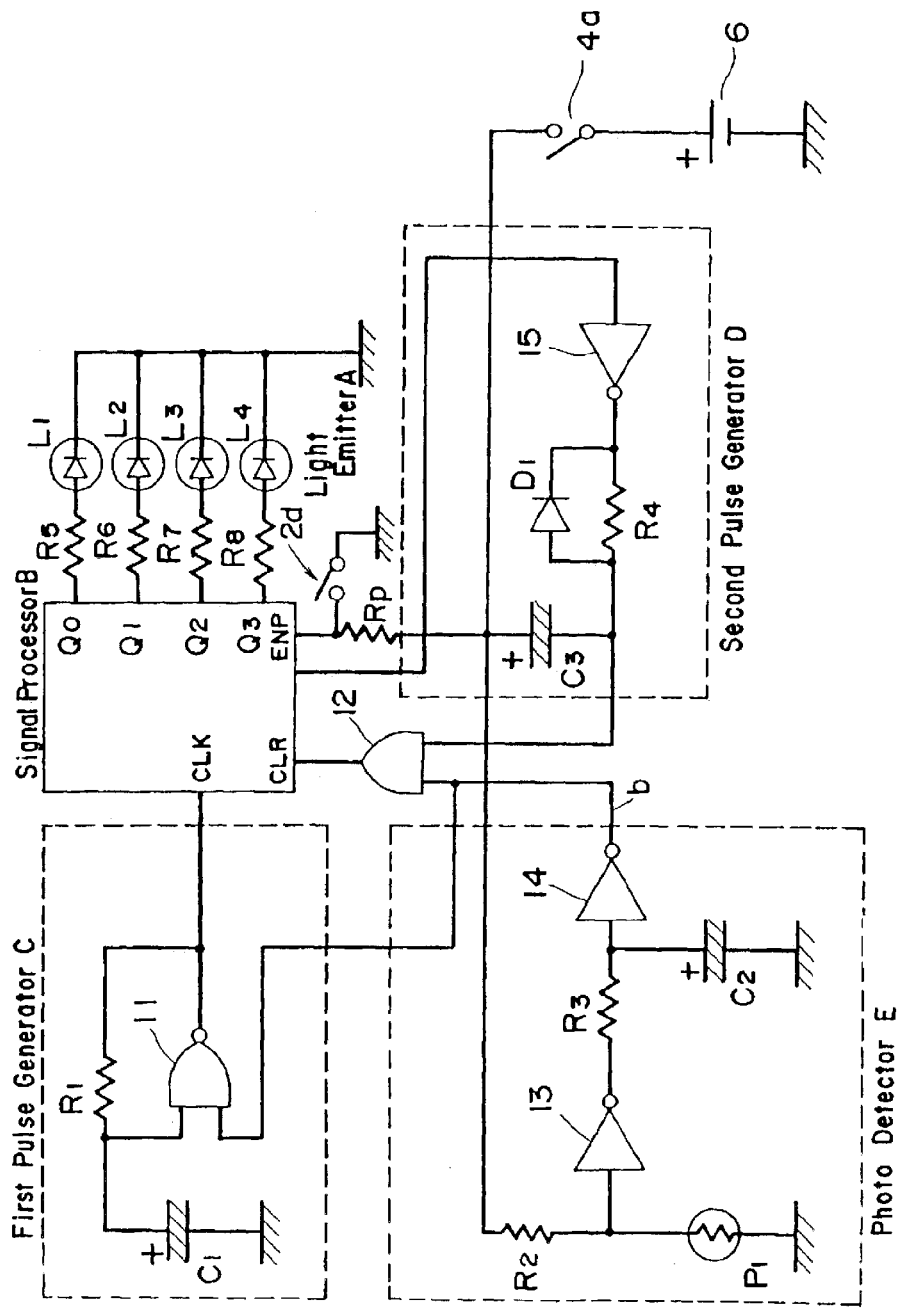
FIG. 6 is a circuit diagram showing an electrical circuit which can be applied to the accessory according to the first embodiment of the present invention.

The circuit arrangement of the light emitter A, the signal processor B, the first pulse generator C, the second pulse generator D, and the photo detector F will be described below with reference to FIG. 6. In this embodiment, four light-emitting elements are used for the light emitter A; a 4-bit binary counter (for example, SN74HC161 of Texas Instruments Co.) for the signal processor B; a clock oscillator for the first pulse generator C; a monostable multivibrator for the second pulse generator D; and a photosensor for the photo detector E.

The first pulse generator C comprises, e.g., a NAND Schmitt gate 11, a resistor R1, and a capacitor C1. The output terminal of the NAND Schmitt gate 11 is connected to the signal processor B. This output terminal is also connected to the resistor R1. The resistor R1 is connected to the "plus (+)" terminal of the capacitor C1. The "minus (-)" terminal of the capacitor C1 is connected to ground. One input terminal of the NAND Schmitt gate 11 is connected between the resistor R1 and the capacitor C1, and the other input terminal is connected to one input terminal of an OR gate 12 connected to the clear (CLR) terminal of the signal processor B.

The photo detector E comprises, e.g., Schmitt inverter gates 13 and 14, a photosensor P1, resistors R2 and R3, and a capacitor C2. The output terminal of the Schmitt inverter gate 14 is connected to the input terminal of the OR gate 12. An integral circuit constituted by the resistor R3 and the capacitor C2 is connected between the Schmitt inverter gate 13 and 14 and the input terminal of the Schmitt inverter gate 13 is connected between the resistor R2 and the photosensor P1. The line from the resistor R2 and the photosensor P1 serves as a power supply line connected to the switch 4a and the battery 6.

The second pulse generator D comprises, e.g., a NAND Schmitt gate 15, a diode D1, a resistor R4, and a capacitor C3. The output terminal of the NAND Schmitt gate 15 is connected to the other input terminal of the OR gate 12. The input terminal of the NAND Schmitt gate 15 is connected to the signal processor B. The resistor R4 is connected between the output terminal of the NAND Schmitt gate 15 and the other input terminal of the OR gate 12. The diode D1 is connected in parallel with the resistor R4. The capacitor C3 is connected to a line for connecting the power supply line and a line connecting the resistor R4 and the input terminal of the OR gate 12.

The signal processor B receives the pulse signal from the first pulse generator C, the light detection signal from the photo detector E, and an operation stop signal from the second pulse generator D, and outputs electrical signals to its output terminals Q0, Q1, Q2, and Q3 at predetermined timings. These output terminals are connected to light-emitting elements L1, L2, L3, and L4 through resistor R5, R6, R7, and R8, respectively. For this reason, these electrical signals are sent to the light-emitting elements L1, L2, L3, and L4 at predetermined timings. Further, switch 2d is connected between the signal processor B and the power supply line through resistor Rp. The switch 2d is connected to ENP terminal in case that a 4-bit binary counter is used for the signal processor. For this reason, closing the switch 2d changes the input signal of ENP terminal from low to high and its output state of the output terminals Q0, Q1, Q2, and Q3 is maintained.

The operations of this circuit in low and high illumination cases will be described below in turn. First, low illumination case (i.e., a case wherein no light is incident) will be described below. When the switch 4a is closed, the internal resistance of the photosensor P1 is increased, and after the lapse of a time determined by a time constant of the resistor R2 and the capacitor C2, the output of the Schmitt inverter gate 13 goes low. Therefore, the output of the Schmitt inverter gate 14 goes high. The interval of high output of the Schmitt inverter gate 14 can be arbitrarily determined by the time constant of the resistor R3 and the capacitor C2. When the output from the Schmitt inverter gate 14 goes high, the output from the NAND Schmitt gate 11 goes high. Thus, the first pulse generator C starts self-excited oscillation (free running). For this reason, a pulse signal having a short pulse interval shown in FIG. 7A is supplied to the signal processor B.

Figure 7:
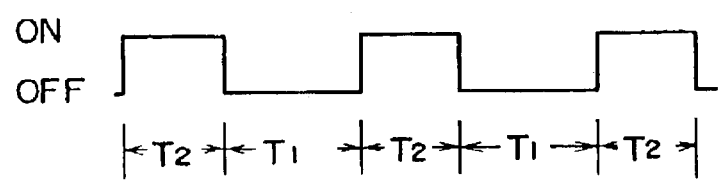
FIG. 7 is a timing chart of a second pulse signal of the second pulse generator according to the first embodiment of the present invention.
Figure 8:
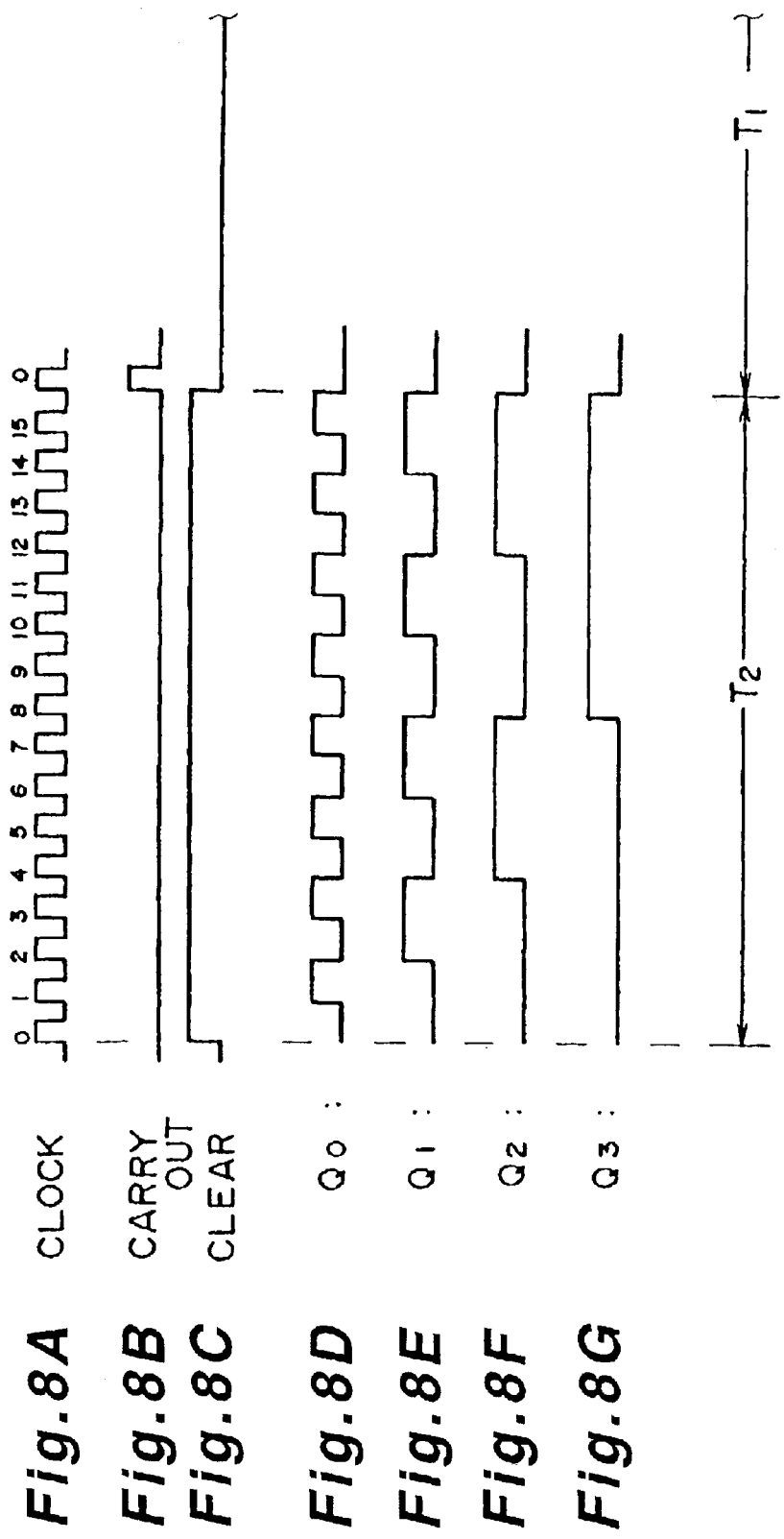
FIGS. 8A, 8B, 8C, 8D, 8E, 8F, and 8G are timing charts of input and output signals of a signal processor according to the first embodiment of the present invention.

In a steady state, since the signal processor B supplies a low-level signal to the NAND Schmitt gate 15, the output from the NAND Schmitt gate 15 is set at high. For this reason, a high signal is input to the input terminal of the OR gate 12. As a result, since the high signals are input to the input terminals of the OR gate 12, a high signal is output. Thus, the signal processor B is enabled, and electrical signals shown in FIGS. 8D, 8E, 8F, and 8G are supplied to the light emitter A. After the lapse of a predetermined period of time (until 16 pulses are input to the signal processor B), a carry signal (CR) is supplied from the signal processor to the NAND Schmitt gate 15 (FIG. 8B), thus inverting the signal output from the second pulse generator D. In this case, since the signal is converted from high to low, a signal input to the CLR terminal of the signal processor B goes low (FIG. 8C). In this manner, when the carry signal is input, the output signal from the second pulse generator D can be changed, as shown in FIG. 7. If pulse intervals shown in FIG. 6 are represented by T1 and T2, the signal processor B is enabled for the time interval T2, and is disabled for the time interval T1. After the lapse of time determined by the time constant of the resistor R4 and the capacitor C3, the signal output from the second pulse generator D goes to high again, and the signal processor B is enabled again.

Even if it becomes dark and the internal resistance of the photosensor P1 is increased, the output from the Schmitt inverter gate 13 does not go low unless the time determined by the time constant of the resistor R2 and the capacitor C2 has elapsed. Therefore, the operation of the signal processor B will not be interrupted by an ON state of the light emitter A.

FIG. 9 shows timings at which the signal processor B supplies the electrical signals to the light emitter A in an enabled state. In this case, the light-emitting element L1 emits light in response to a first clock, the light-emitting element L2 emits light in response to a second clock, and the light-emitting elements L1 and L2 emit light in response to a third clock. In this manner, when the 4-bit binary counter is used, a large number of combinations or patterns of light emission can be realized. Further, present emitting state can be maintained when the switch 2d is closed in the enable state.

Under high-illumination, since the light detection signal is supplied to the signal processor B, the internal resistance of the photosensor P1 is decreased, and the output from the Schmitt inverter gate 13 goes high. Therefore, the output from the Schmitt inverter gate 14 goes low. The interval of low output from the Schmitt inverter gate 14 can be arbitrarily determined by the time constant of the resistor R2 and the capacitor C2. When the output from the Schmitt inverter gate 14 goes low, the output from the NAND Schmitt gate 11 goes low. Therefore, oscillation of the first pulse generator C is stopped. In this case, since one input signal of the OR gate 12 goes low, the output signal from the OR gate 12 goes low regardless of the input signal from the second pulse generator D. Thus, the signal processor B is kept cleared. In this case, since no pulse is input from the first pulse generator C, no carry signal is supplied from the signal processor B to the second pulse generator D.

Embodiment 2

In the first embodiment, the electrostatic absorption sheet 200 as a holding member of the transparent body 1 is explained. However, the present invention is not limited to the embodiment, it is possible to adopt a shape memory alloy as a holding member of the transparent body 1.

Figure 10A:
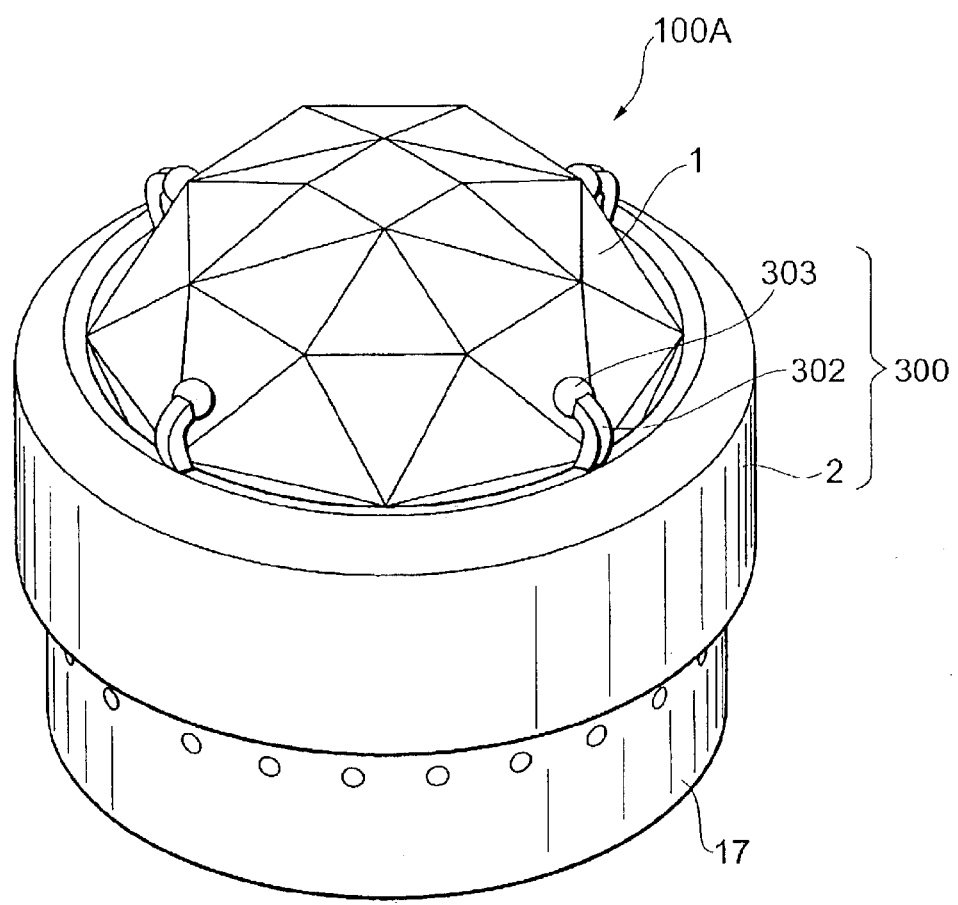
FIG. 10A is a schematic perspective view showing an accessory according to the second embodiment of the present invention.

FIG. 10A depicts the situation where the transparent body 1 is detachably attached by the tip 303 of the fixing portion 302. In the figure, the transparent body 1 of the accessory 100A is detachably attached to the a transparent body fixing member 2 by means of the transparent body holding member 300 providing a shape memory alloy.

Figure 10B:
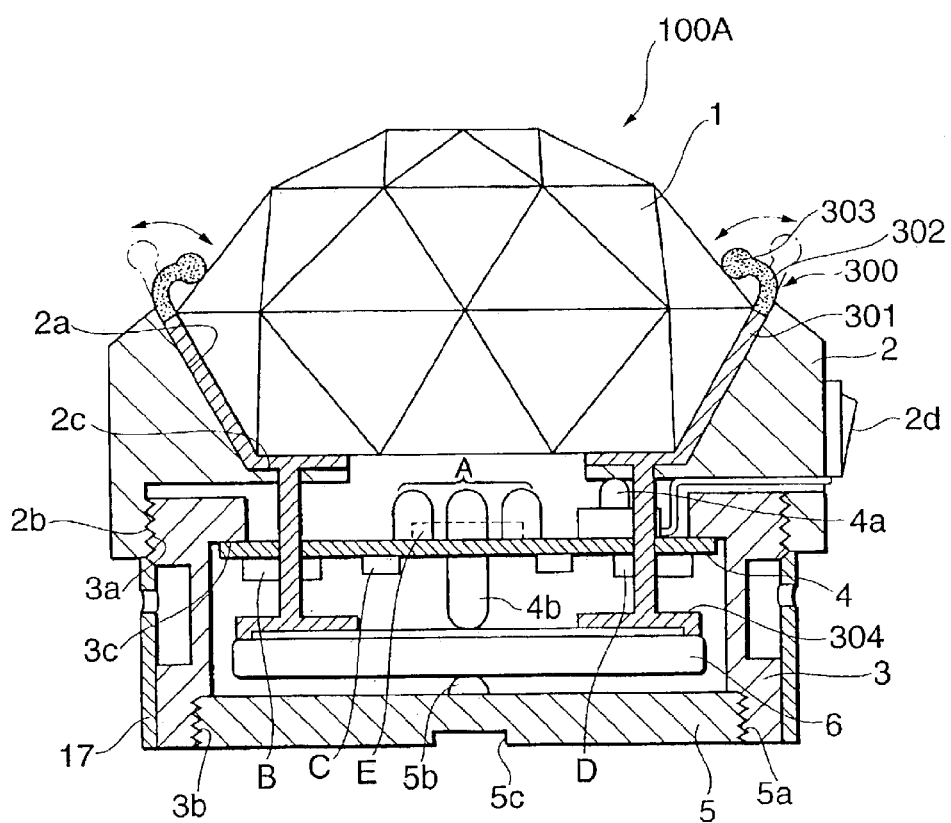
FIG. 10B is a schematic sectional view showing an accessory according to the second embodiment of the present invention.

FIG. 10B is a schematic sectional view showing an accessory 100A according to the second embodiment of the present invention. In the figure, the transparent body holding member 300 comprises a heat collecting member body 301 composed of a good conductive metal such as aluminum or silver and uniform fixing portion 302 made of shape memory alloy. The fixing portion 302 is attached to the tip portion of the heat collecting member body 301 by means of caulking or brazing.

When the light emitter is illuminating, the battery 6 will generate heat. The generated heat is received by the leg portion 304 disposed to contact the battery 6 and then transmitted to the heat collecting member body 301. The heat is further transferred to the fixing portion 302 made of shape memory alloy. The shape memory alloy has a property of bending when heated. Therefore, the tip 303 of the fixing portion 302 is bent inwardly and will fix the transparent body 1. On the other hand, when the switch 4a is opened, the battery 6 will not generate heat. Then, the temperature of the fixing portion 302 returns to the ambient temperature and the fixing portion 302 will move to the extended position as shown by the dashed line in FIG. 10B. This enables the release of the transparent body 1.

For the shape memory alloy, nonferrous type shape memory alloy such as Nickel-Titanium alloy or Copper alloy, and ferrous type shape memory alloy such as Iron-Platinum alloy, Iron-Nickel-Cobalt-Titanium alloy, Iron-Palladium alloy and other kind of shape memory alloy can also be applied. The shape of the fixing portion 302 is not limited to that depicted in FIGS. 10A and 10B, but various other shapes can also be used.

Since the constructions and operations of the light emitting section in the second embodiment (and in the following embodiments) is same as that in the first embodiment, the explanation thereof is omitted.

Embodiment 3

Figure 11A:
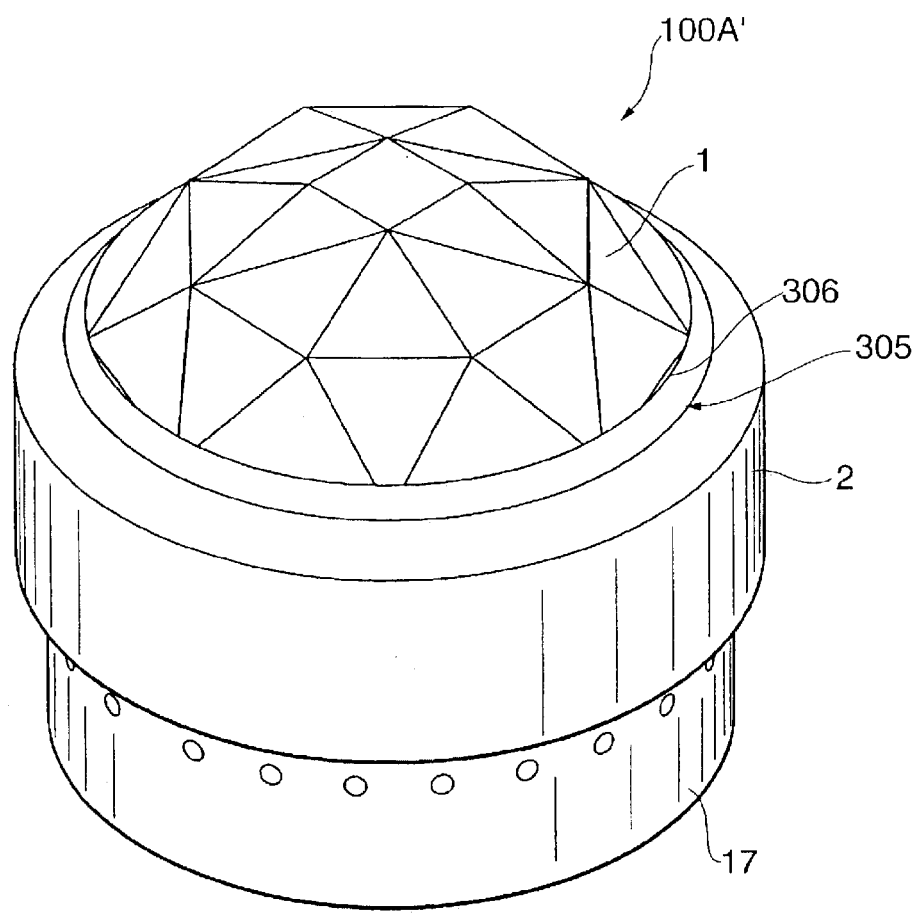
FIG. 11A is a schematic perspective view showing an accessory according to the third embodiment of the present invention.

FIG. 11A depicts the states where the transparent body 1 is detachably attached by the fixing portion 306 of the transparent body holding member 305. In the figure, the transparent body 1 of the accessory 100A' is detachably attached to the transparent body fixing member 2 by the means of the holding member 305.

Figure 11B:
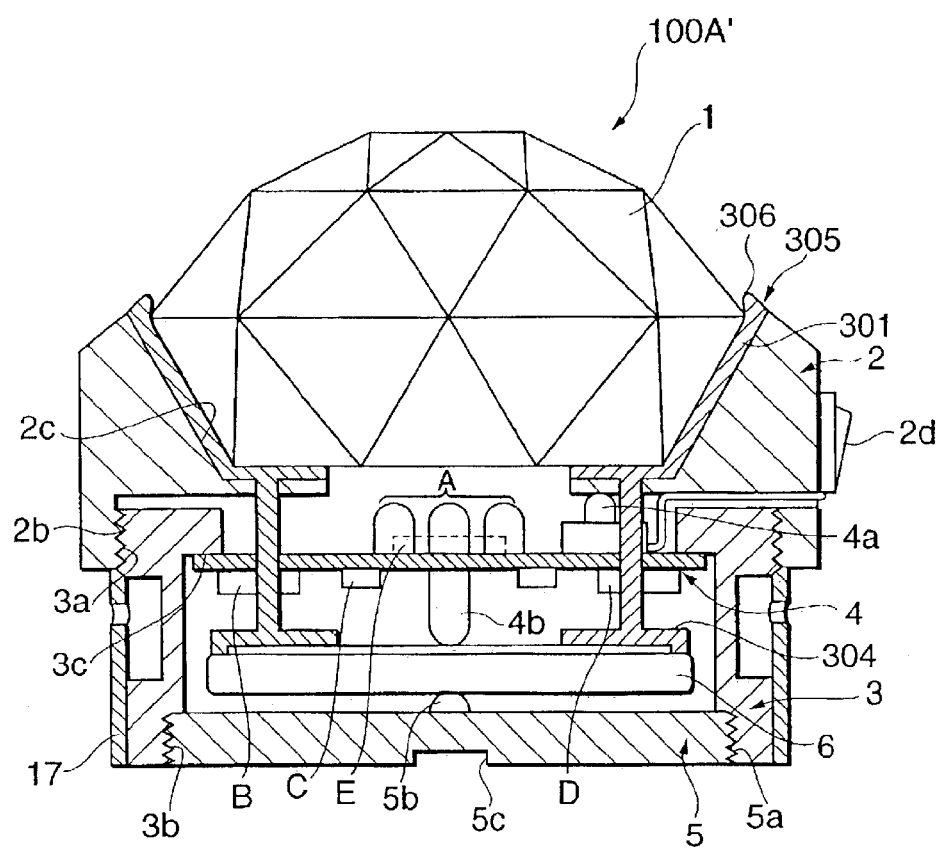
FIG. 11B is a schematic sectional view showing an accessory according to the third embodiment of the present invention.

FIG. 11B is a schematic sectional view showing an accessory 100A' according to the third embodiment of the present invention. In the figure, the transparent body holding member 305 comprises a heat collecting member body 301 made of a good heat conductive metal such as Aluminum or Silver and an uniform fixing portion 306 made of the same metal as that of the heat collecting member body 301.

As in the same manner in the second embodiment, the heat from the battery 6 is received by the leg portion 304, which is disposed to contact the battery 6, and is transmitted to the heat collecting member body 301. This heat will expand the fixing portion 306 so as to fix the transparent body 1. On the other hand, when the switch 4a is opened, the battery 6 will not generate heat. Then, the temperature of the fixing portion 306 returns to the ambient temperature and the fixing portion 302 will contract to the original size. This enables to release the transparent body 1.

Embodiment 4

Figure 12:
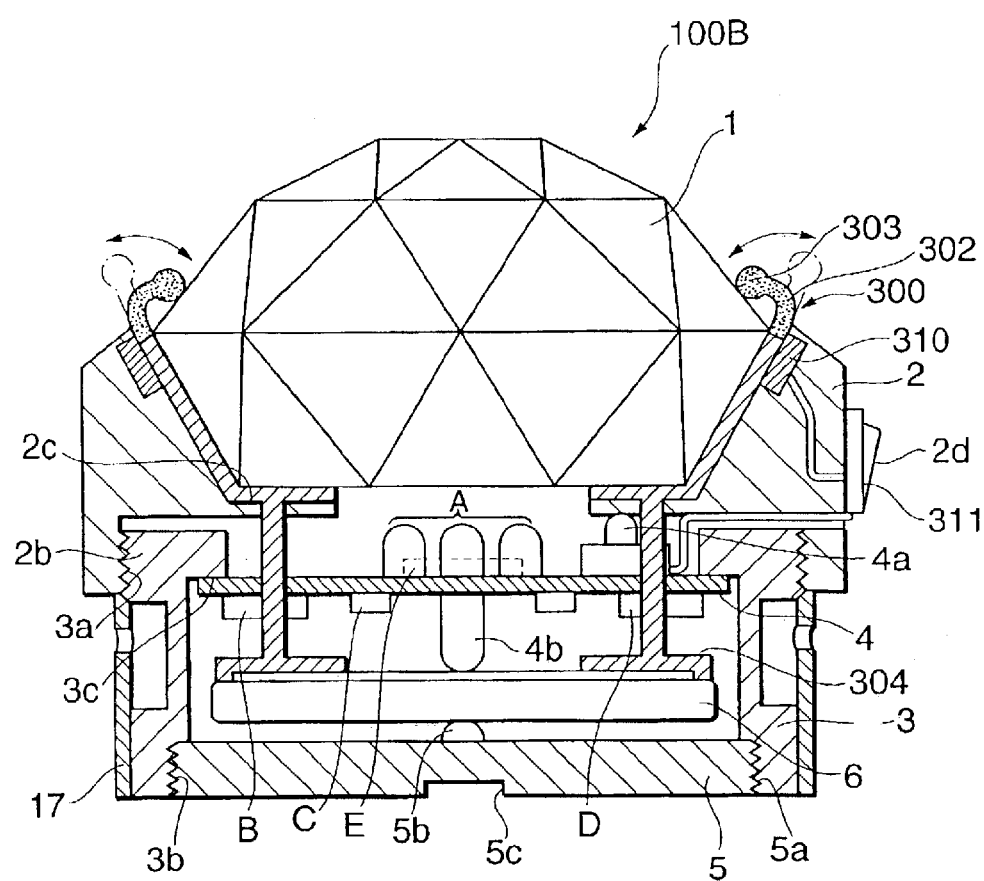
FIG. 12 is a schematic sectional view showing an accessory according to the fourth embodiment of the present invention.

FIG. 12 is a schematic sectional view showing an accessory according to the fourth embodiment of the present invention, wherein a heater 310 is provided adjacent to the heat collecting member body 301 and the fixing portion 302. When the heat generation is insufficient, it is possible to provide compensating heat by using the heater 310. In addition, by providing a switch 311 on the outside of the transparent body fixing member 2, the heater 310 can be heated or cooled by operating the switch 311 on/off, thereby enabling the transparent body to be hold or released. The heater can also be provided near the fixing portion 306 of the holding member 305.

Embodiment 5

Figure 13A:
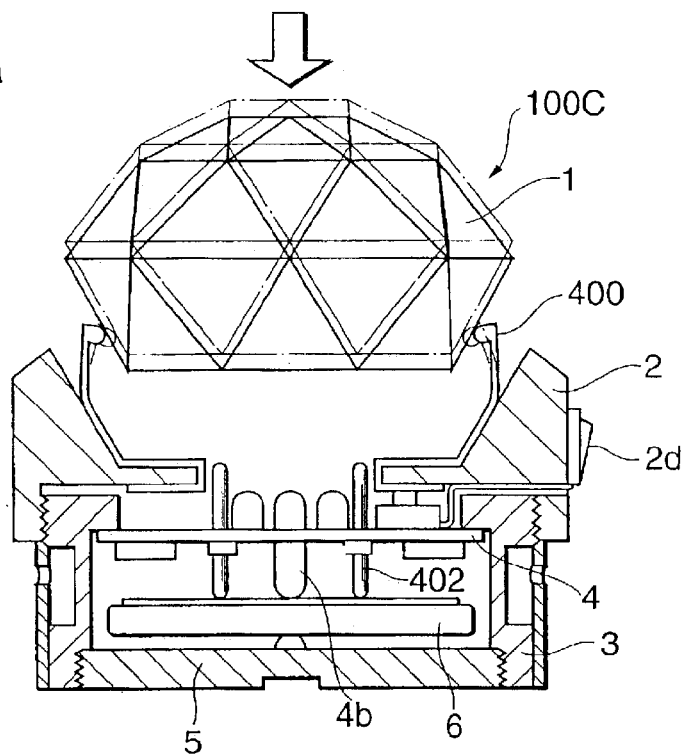
FIGS. 13A and B are schematic sectional views showing an accessory according to the fifth embodiment of the present invention.
Figure 13B:
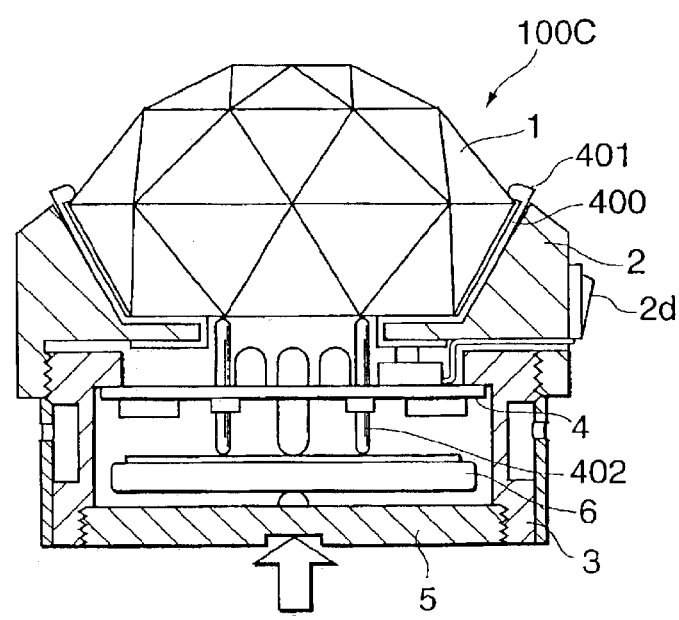

FIGS. 13A and 13B depict the situation where the transparent body 1 of the accessory 100C is detachably attached by means of a spring type elastic member 400. As shown in FIG. 13A, by pressing the transparent body 1 downward, the elastic member 400 is spread outwardly. Then, the bottom portion of the transparent body 1 is pressed to reach to the flange 2c, a top portion 401 of the elastic member 400 fixes the side of the transparent body 1, as shown in FIG. 13B. On the other hand, the transparent body 1 may be released by pressing the battery holding member 5 upwardly. Pin 402 slidably disposed through the circuit board 4 presses the bottom of the transparent body 1. This operation releases the transparent body 1 from the transparent body fixing member 2. Preferably, the battery holding member 5 can be formed by the material which has an appropriate elasticity capable of bending upon pressing. Since the elastic member 400 can be manufactured by metals or plastics, plastics are preferably used for the elastic member 400 to avoid injury to the transparent body 1.

Embodiment 6

Figure 14A:
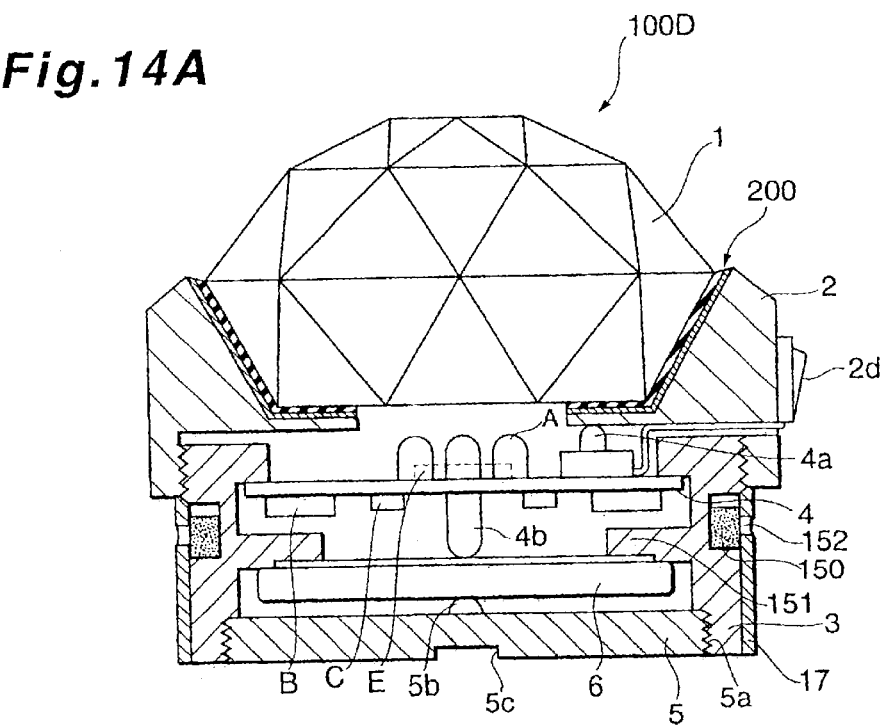
FIG. 14A is a schematic sectional view showing an accessory according to the sixth embodiment of the present invention.

FIG. 14A is a schematic sectional view showing an accessory according to the sixth embodiment of the present invention and is basically same construction as the accessory depicted in FIG. 2. Differences from FIG. 2 are that an aromatic material 150 is disposed on the side of the board fixing member 3 and a heat collecting member 151 for transferring the heat from the battery 6 to the aromatic material 150. The effect of the aromatic material can pleasantly stimulate the sense of smell of persons near the person wearing the accessory 100D.

As mentioned above, when the light emitter is illuminating, the battery 6 will generate heat. The heat is received by the heat collecting member 151 and transmitted to the aromatic material 150 so as to warm it. Then the aromatic material 150 generates an aromatic aroma and the aroma is diffused outside of the accessory 100D through openings 152.

Figure 14B:
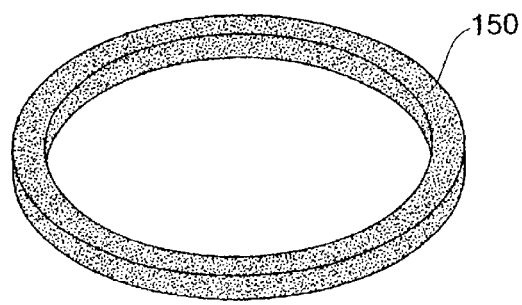
FIG. 14B is a perspective view showing an aromatic material.

The aromatic material 150 has a ring shape as shown in FIG. 14B and may have cut-away portion (not shown) to enable easy attachment to the board fixing member 3. As for the aromatic material 150, non-woven fabric of cotton or plastics soaked with liquid aromatic material can be used and the aromatic material may be jelly or a solid.

Embodiment 7

Figure 15:
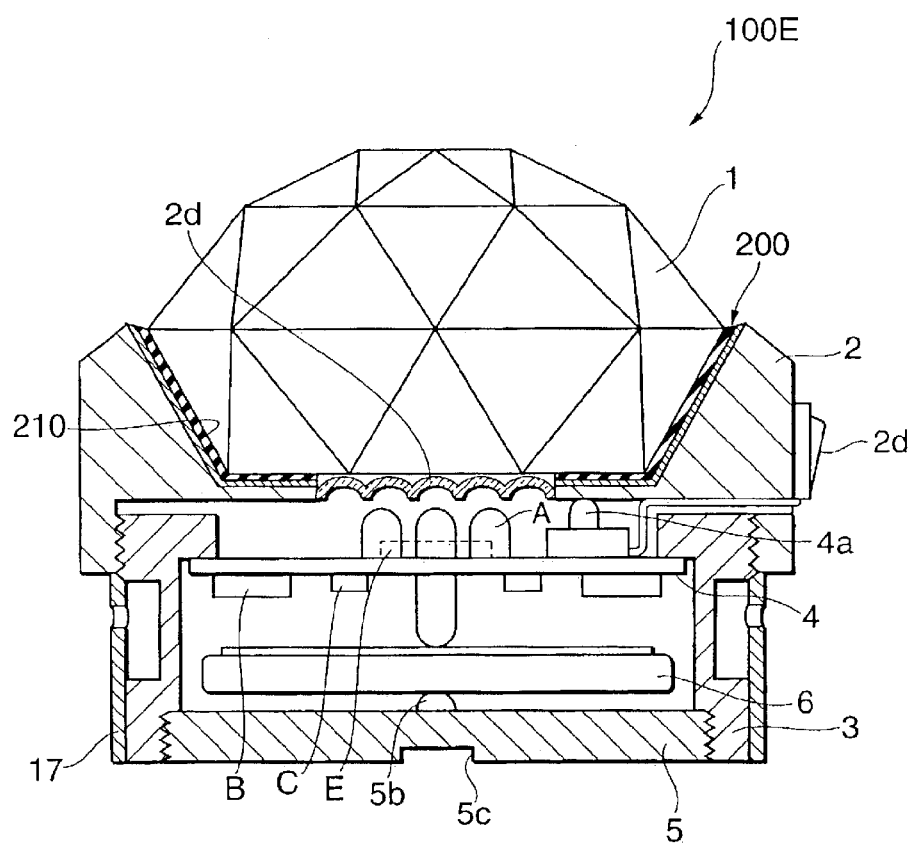
FIG. 15 is a schematic sectional view showing an accessory according to the seventh embodiment of the present invention.

FIG. 15 is a schematic sectional view showing an accessory according to the seventh embodiment of the present invention and is basically same construction as the accessory depicted in FIG. 2. Differences from FIG. 2 are that a light scattering portion 2d is formed at the central portion of the transparent body fixing member 2, a reflecting film 210 coats the inner surface of the synthetic resin sheet 201 facing the transparent body 1.

In this embodiment, light emitted from the light emitter A is satisfactorily scattered through the light scattering portion 2d and the scattered light components are incident on the transparent body 1. As a result, a person can experience further brilliance. Fluorescent material may be coated instead of the reflecting film 210.

Embodiment 8

Figure 16:
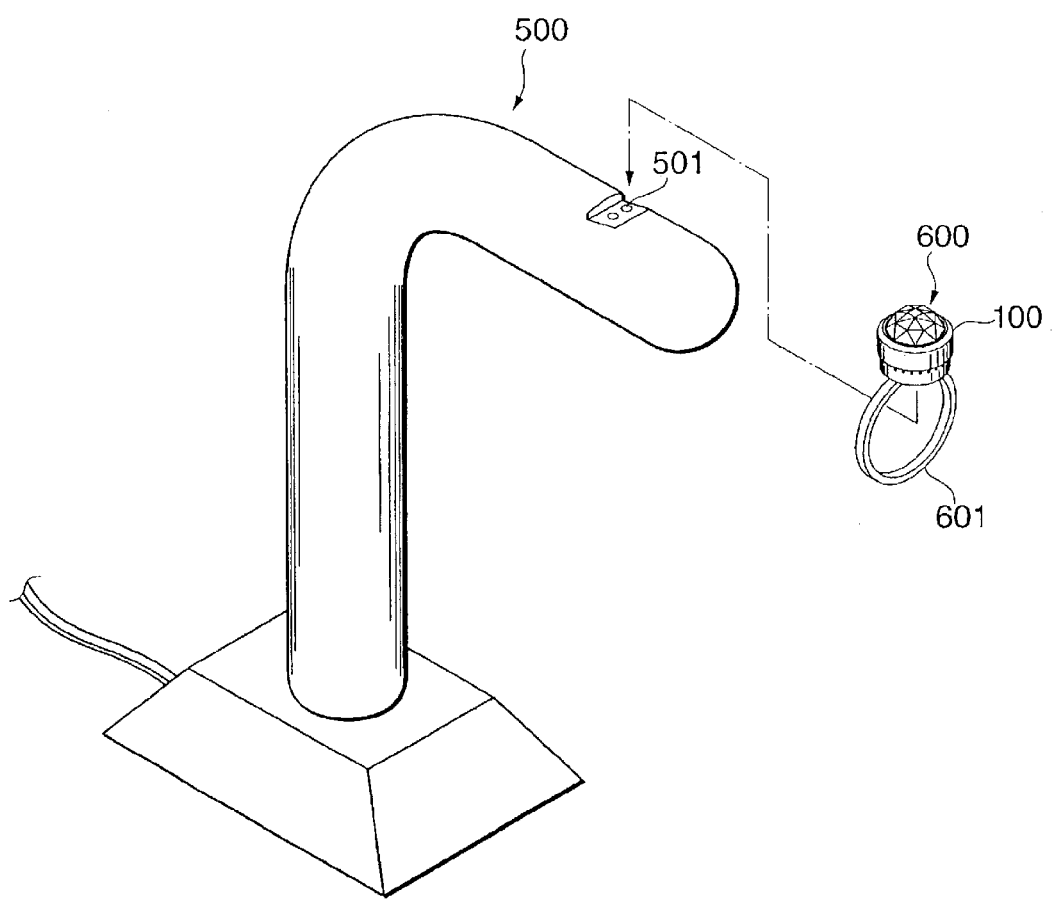
FIG. 16 is a perspective view showing an accessory such as a finger ring.

FIG. 16 is a perspective view showing an accessory such as a finger ring according to the eighth embodiment. In FIG. 16, for example, a finger ring 600 comprised of an accessory 100 is placed on the pedestal 500 having a built-in AC adapter (not shown). The finger ring 600 is composed of the accessory 100 accommodating a rechargeable battery (not shown) and the ring 601 attached thereto. By using the rechargeable battery, it is possible to minimize the burden of opening the battery holding member 5 and changing the battery 6. In addition, since sufficient battery power can be supplied, it is possible to minimize the transparent body 1 reliably when using the transparent body holding member 300 providing the electrostatic absorption sheet 200 or shape memory alloy. Although only the accessory 100 is explained in this embodiment, this embodiment can also accommodate accessories 100A to 100E.

The finger ring pedestal 500 provides terminals 501 which contact with terminals (not shown) formed on the inner side of the finger ring 600. Terminals 501 make it possible to charge the rechargeable battery. Alternatively, it is possible to adopt non-contact terminals which are chargeable through an electromagnetic induction.

Note that the present invention is not limited to the above embodiments. For example, the light emitter A, the signal processor B, the first pulse generating means C, the second pulse generator D, and the photo detector D need not be assembled on a single circuit board.

Further, this invention can be applied to as a sash clip, a tiepin, a necklace, a bracelet, etc. In the above mentioned embodiments, light emitting elements such as LED are used as the light emitter A, however, CCD, liquid crystal and other light emitting member can also be used.

Still further, it is possible to provide a family crest, engraved mark, trade mark, illustration and the like on the backside of the accessory, not only embellishing the effect of the accessory but also making the accessory more distinctive.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An accessory utilizing a light emitter, comprising:

a transparent body;

a transparent body fixing member for receiving said transparent body;

a holding member for detachably attaching said transparent body on said transparent body fixing member;

said light emitter, arranged near a transparent body, intermittently emitting light upon reception of an electrical signal;

a first pulse generator for generating a first pulse signal at a relatively short pulse interval;

a photo detector for detecting light incident on said transparent body and generating a light detection signal;

a second pulse generator for generating a second pulse signal at a relatively long pulse interval;

a signal processor for receiving the first pulse signal, the second pulse signal, and the light detection signal and supplying the electrical signal to said light emitter at a predetermined timing;

a circuit board for mounting said light emitter, first pulse generator, photo detector, second pulse generator and signal processor thereon;

a board fixing member connected to said transparent body fixing member for fixing said circuit board; and a battery holding member connected to said board fixing member for holding a battery, wherein said holding member of said transparent body is an electrostatic absorption sheet.

2. The accessory according to claim 1, wherein said electrostatic absorption sheet comprises a synthetic resin sheet and an electrode layer.

3. An accessory utilizing a light emitter, comprising:

a transparent body;

a transparent body fixing member for receiving said transparent body;

a holding member for detachably attaching said transparent body on said transparent body fixing member;

said light emitter, arranged near a transparent body, intermittently emitting light upon reception of an electrical signal;

a first pulse generator for generating a first pulse signal at a relatively short pulse interval;

a photo detector for detecting light incident on said transparent body and generating a light detection signal;

a second pulse generator for generating a second pulse signal at a relatively long pulse interval;

a signal processor for receiving the first pulse signal, the second pulse signal, and the light detection signal and supplying the electrical signal to said light emitter at a predetermined timing;

a circuit board for mounting said light emitter, first pulse generator, photo detector, second pulse generator and signal processor thereon;

a board fixing member connected to said transparent body fixing member for fixing said circuit board; and a battery holding member connected to said board fixing member for holding a battery, wherein said holding member of said transparent body comprises a fixing portion made of shape memory alloy for fixing said transparent body, a heat collecting member body connected to said fixing portion, and a leg portion for collecting heat from the battery and transmitting the heat to said heat collecting member body.

4. The accessory according to claim 3, wherein a heater is provided proximate to said fixing portion.

5. An accessory utilizing a light emitter, comprising:

a transparent body;

a transparent body fixing member for receiving said transparent body;

a holding member for detachably attaching said transparent body on said transparent body fixing member;

said light emitter, arranged near a transparent body, intermittently emitting light upon reception of an electrical signal;

a first pulse generator for generating a first pulse signal at a relatively short pulse interval;

a photo detector for detecting light incident on said transparent body and generating a light detection signal;

a second pulse generator for generating a second pulse signal at a relatively long pulse interval;

a signal processor for receiving the first pulse signal, the second pulse signal, and the light detection signal and supplying the electrical signal to said light emitter at a predetermined timing;

a circuit board for mounting said light emitter, first pulse generator, photo detector, second pulse generator and signal processor thereon;

a board fixing member connected to said transparent body fixing member for fixing said circuit board; and a battery holding member connected to said board fixing member for holding a battery, wherein said holding member of said transparent body comprises a fixing portion for fixing said transparent body, a heat collecting member body connected to said fixing portion, and a leg portion for collecting heat from the battery and transmitting the heat to said heat collecting member body, wherein said fixing portion, said heat collecting member body and said leg portion are formed integrally.

6. The accessory according to claim 5, wherein a heater is provided proximate to said fixing portion.

7. The accessory according to any of claims 1, 3 and 5, wherein said holding member of said transparent body is an elastic member for attaching said transparent body into said transparent body fixing member by an application of pressure.

8. The accessory according to claim 7, further comprising a pin member for pressing said transparent body outwardly.

9. The accessory according to any of claims 1, 3 and 5, further comprising a heat collecting member for collecting heat from the battery, and aromatic material for emitting a fragrance by the application of the heat from said heat collecting member.

10. The accessory according to any of claims 1, 3 and 5, further comprising a light scattering portion disposed between said transparent body and said light emitter.

11. The accessory according to any of claims 1, 3 and 5, wherein the battery is a rechargeable battery.

12. The accessory according to any of claims 1, 3 and 5, wherein said accessory is a finger ring.

13. The accessory according to any of claims 1, 3 and 5, wherein said light emitter is a LED, CCD or liquid crystal.

14. The accessory according to any of claims 1, 3 and 5, wherein at least one of a family crest, an engraved mark, a trade mark, and an illustration is provided on the rear surface of said accessory.

15. The accessory according to any of claims 1, 3 and 5, wherein said light emitter is used in an accessory body attached to a human body.

* * * * *